United States Patent Office 3,555,051
Patented Jan. 12, 1971

3,555,051
GAMMA-METHACRYLOXY-ALPHA,BETA-EPOXY-PROPYLTRIMETHOXYSILANE
James G. Marsden, Amawalk, and Samuel Sterman, Chappaqua, N.Y., assignors to Union Carbide Corporation, a corporation of New York
No Drawing. Continuation-in-part of application Ser. No. 231,273, Oct. 17, 1962. This application Jan. 30, 1968, Ser. No. 701,533
Int. Cl. C07d 1/00
U.S. Cl. 260—348                              1 Claim

ABSTRACT OF THE DISCLOSURE

This invention is directed to acryloxy or methacryloxy substituted organosilicon compounds in which the organo portion connects the acryloxy or methacryloxy moieties to the silicon atom and contain ethylenic unsaturation or 1,2-epoxy groups.

---

This application is a continuation-in-part of application Ser. No. 231,273, filed Oct. 17, 1962, now abandoned.

This invention relates to novel organosilicon compositions, to curable polymeric materials incorporating such organosilicon compositions, and to composite structures formed from such organosilicon compositions, curable polymeric materials and reinforcing material. In particular, it relates to novel acryloxy and methacryloxy substituted organosilanes and organosiloxanes and their uses in curable polymeric systems. In addition, this invention is directed to the epoxidized derivatives of said silanes and siloxanes and their use in polymeric systems.

Curable polymeric materials can be employed to obtain resins and elastomers having a wide range of commerical applications. One area of utility is in the formation of composite structures prepared from reinforcing material, such as fibers, fabric and fillers and a curable polymeric material. Use of such composite structures, such as those employed in the production of glass fabric reinforced or glass fiber-filled plastic sheets, commonly referred to as "laminates," has become a major industry in recent years. The laminates which are currently of interest in this area are glass cloth-polyester resin compositions. Such laminates have found uses in aircraft construction, boat hulls, automobile bodies, bathtubs, fishing rods, and the like because of their high strength to weight ratio. One of the major problems encountered in the production of such laminates is that of obtaining a high quality composition with respect to the strength and permanence of the bonding of the resin to the glass, especially under conditions of high humidity or in contact with water.

Laminates in which the strength is dependent upon mechanical bond alone have been found quite satisfactory in applications where exposure to water or high humidity is not encountered, but upon exposure to water of high humidity the loss in strength may run as high as 50 to 60 percent.

It is well known in the art of preparing glass-reinforced resin composites that the use of a coupling agent on the glass fiber or cloth significantly improves the overall physical strength, particularly the wet strength of the system. Vinylsilanes have a long and useful history as coupling agents in such application with unsaturated polyester resins. It is believed that vinylsilanes function as coupling agents by locking onto the surface of a glass reinforcement fiber or cloth through formation of ≡Si—O—Si≡ linkages and with the unsaturated polyester resin by the vinyl group copolymerizing with either the unsaturated polyester, the monomeric styrene that is a component of most commercial unsaturated polyester resins, or both.

It has now been found that a novel organosilicon composition of matter can be used to obtain significantly improved results when incorporated in curable polymeric systems. This novel organosilicon compound has the general formula

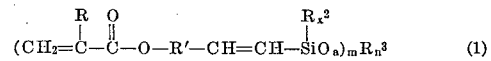

$$(CH_2=\overset{R}{\underset{|}{C}}-\overset{O}{\underset{\|}{C}}-O-R'-CH=CH-\overset{R_x^2}{\underset{|}{Si}}O_a)_m R_n^3 \quad (1)$$

wherein R is a hydrogen atom or methyl ($CH_3$) radical; $R^1$ is a divalent aliphatic hydrocarbon radical; $R^2$ is a monovalent hydrocarbon radical free of aliphatic unsaturation; $R^3$ is hydrogen or a monovalent organic radical free of aliphatic unsaturation selected from the class consisting of alkyl groups, aryl groups, alkaryl groups, aralkyl groups and acyl groups; $x$ is an integer having a value from 0 to 2 inclusive; $n$ is zero or a positive number; $m$ has a value of at least one and indicates the degree of polymerization when $m$ is greater than one; and $a$ is equal to $3-x$ when $m$ is one, in which case $n$ is equal to $3-x$, or is equal to $3-x/2$ when $m$ is greater than one; provided that $R^3$ is a monovalent organic radical free of aliphatic unsaturation when $m$ is one.

The divalent aliphatic hydrocarbon radicals which constitute $R^1$ in the above formula are typically linear aliphatic chains which may contain olefinic double bonds. These linear aliphatic chains preferably contain from 1 to 5 carbon atoms, but longer chains can be used if desired. Examples of linear $R^1$ radicals are —$CH_2$—; —$CH_2CH_2$—; —$CH_2CH_2CH_2$—; —$CH_2CH_2(CH_3)$—; —CH=CH—; —$CH_2CH$=CH—;
—$CH_2CH_2CH$=CH—;
—$CH_2CH$=$CHCH_2$—;     —$CH_2CH_2CH_2CH$=CH—;
—$CH_2CH$=$CHCH_2CH_2$—;  —CH=$CHCH_2CH_2CH_2$—;
and the like. Also, $R^1$ can be a branched aliphatic chain containing olefinic unsaturation.

Examples are:

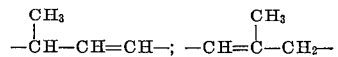

$$-\underset{|}{\overset{CH_3}{CH}}-CH=CH-; \quad -CH=\underset{|}{\overset{CH_3}{C}}-CH_2-$$

and the like.

The monovalent hydrocarbon radicals free of aliphatic unsaturation which constitute $R^2$ in the above formula are illustrated by alkyl groups, such as methyl, ethyl, propyl, isopropyl, butyl, isobutyl, amyl, hexyl and the like; aryl groups, such as phenyl, naphthyl and the like; alicyclic groups, such as cyclopentyl, cyclohexyl and the like; aralkyl groups, such as benzyl, phenylethyl and the like; alkaryl groups, such as ethylphenyl, dimethylphenyl, mesityl, and the like. To enhance water-solubility of the compound, it is preferred that $R^2$ be an alkyl group containing from 1 to 4 inclusive carbon atoms. The monovalent organic radicals free of aliphatic unsaturation which constitute $R^3$ in the above formula are illustrated by the alkyl, aryl, alkaryl and aralkyl groups described above for $R^2$ and by acyl groups, such as acetyl, propionyl, butyryl, benzoyl and the like. It is preferred that $R^3$ be an alkyl group containing from 1 to 4 inclusive carbon atoms.

Illustrative of compounds which fall within the scope of the above formula are:

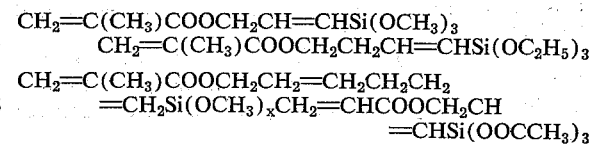

$CH_2$=$C(CH_3)COOCH_2CH$=$CHSi(OCH_3)_3$
    $CH_2$=$C(CH_3)COOCH_2CH_2CH$=$CHSi(OC_2H_5)_3$
$CH_2$=$C(CH_3)COOCH_2CH_2$=$CH_2CH_2CH_2$
    =$CH_2Si(OCH_3)_xCH_2$=$CHCOOCH_2CH$
        =$CHSi(OOCCH_3)_3$
and

$CH_2$=$C(CH_3)COOCH_2CH$=$CHSi(OOCCH_3)_3$

The novel oxirane compounds of this invention possess the acrylyl or methacrylyl unsaturation of the aforementioned silanes and contain epoxy groups in the divalent bridge separating the acryloxy group from the silicon atom. Such compounds are illustrated by the following general formula:

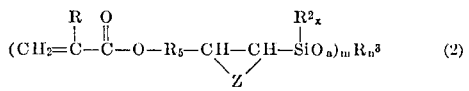

wherein $x$, $n$, $m$, $a$, R, $R^2$ and $R^3$ have the meaning ascribed for them above, $R^5$ is $R^1$, described above, or a 1,2-epoxy containing divalent alkylene radical such as

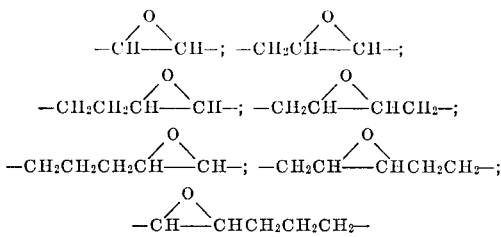

and the like; and Z is oxygen or a bond of a double bond between the adjacent carbon atoms thereto; provided that Z is oxygen when $R^5$ is $R^1$ and is oxygen or the bond of the double bond when $R^5$ is an epoxy containing divalent alkylene radical.

The above compound is mono epoxy or polyepoxy depending upon the amount of ethylenic unsaturation per silicon atom present in compound (1) prior to epoxidation and the amount of epoxidation of compound (1).

The curable polymeric materials which can incorporate the novel acryloxy and methacryloxy substituted organosilicon compounds of the present invention to produce cured products having improved properties can be selected from the class of materials consisting of (1) polymerizable compounds containing reactive unsaturated groups and catalyzed for curing by either free-radical generating agents such as organic peroxides and radiation obtained, for example, from high voltage accelerators and nuclear reactors or by use of ionic curing catalysts, such as Lewis acids, and (2) polymerizable compounds free of reactive unsaturated groups and capable of reacting with the substituted organosilicon compounds in the presence of the above-mentioned free-radical generating agents.

Curable polymeric materials included within category (1) above are, for example, organo-plastics and drying oils. Examples of useful organo-plastics are the unsaturated polyester resins. Such resins are generally composed of the reaction products of maleic anhydride, phthalic anhydride or fumaric acid and ethylene glycol, diethylene glycol or propylene glycol which has been diluted with from 10 to 40 weight percent of monomeric styrene, as well as the corresponding alcohol-, acid-, and oil-modified products. Such resins also include blends of polyesters with other reactive unsaturated groups. These resins typically contain residual hydroxy and/or carboxyl groups which are most suitable for reaction with epoxy groups.

Further examples of organo-plastics are polyacrylonitrile, polystyrene, polydichlorostyrene, polyalphamethylstyrene, polyvinylchloride, polyvinylacetate, polyvinylbutyrate, polyvinylalcohol, polyvinylcarbazole, polyvinylidene chloride, polymethylacrylate, polyethylacrylate, polymethylmethacrylate, acrylic resins, vinyl resins, and the like.

Examples of drying oils included within category (1) above are cottonseed oil, soybean oil, dehydrated castor oil, linseed oil, perilla oil, tung oil, oiticia oil, and the like.

Curable polymeric materials included within category (2) above are, for example, thermoplasts such as polyethylene, polypropylene, polyurethane, polyfluoroethylene and their copolymers. Further materials included within category (2) are aldehyde condensation resins, such as phenol-formaldehyde resins, phenol-acetaldehyde resins, phenol-furfural resins, cresol-formaldehyde resins, urea-formaldehyde resins, melamine-formaldehyde resins and the like.

Still further curable polymeric materials included in category (2) are the epoxy-type resins which comprise, for example, the glycidyl ethers of polyhydric phenols as well as blends of such diglycidyl ethers of polyhydric phenols with such modifying ingredients as the polyphenol compounds. Other useful epoxy resins include derivatives of cyclohexene epoxide; for example, 3,4-epoxy-6-methylcyclohexylmethyl-3,4 - epoxy - 6 - methylcyclohexanecarboxylate, 1 - epoxyethyl - 3,4 - epoxycyclohexane, dicyclopentadiene dioxide and the like.

Examples of curable polymeric materials which could be included within either category (1) or category (2) depending upon the specific composition involved are the amorphous plastic materials, such as natural rubber, buna rubber, butadiene polymers, isoprene, neoprene, butadieneacrylonitrile copolymers, butadiene-isobutylene copolymers, butadiene-styrene copolymers, polymerized 2-chloro-1,3-butadiene, polychloroprene, polyisobutylene and the like.

Further examples of curable polymeric materials which can fit into either category (1) or category (2) depending on the specific composition are the curable polysiloxanes.

These materials can be generally described as having the formula:

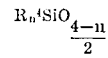

wherein $R^4$ is a monovalent organic radical attached to silicon through carbon-silicon linkages and $n$ has an average value of 0.5 to 2.25. Examples of organic radicals represented by the symbol $R^4$ are as follows: alkyl groups, such as methyl, ethyl, propyl, isopropyl, butyl, isobutyl, amyl, hexyl and the like; aryl groups, such as phenyl, naphthyl and the like; alicyclic groups, such as cyclopentyl, cyclohexyl and the like; aralkyl groups, such as benzyl, phenylethyl and the like; alkaryl groups, such as tolyl, ethylphenyl, xylyl, mesityl and the like; alkenyl groups, such as vinyl, allyl, methallyl and the like; and heterocyclic groups, such as furfuryl, thienyl, pyridyl and the like. The above organic radicals may also, if desired, contain substituents, such as halogen groups, amino groups, cyano groups, carboxy groups, nitro groups and the like. $R^4$ may be the same or different radicals throughout the molecule.

The polysiloxane resins are generally formed when $n$ has an average value from about 0.5 to about 1.75 while the polysiloxane elastomers are generally formed when $n$ has an average value from about 1.75 to about 2.25. The polysiloxane resins are preferably formed when $n$ has an average value from about 1.0 to about 1.5, while the polysiloxane elastomers are preferably formed when $n$ has an average value from about 1.95 to about 2.05.

In the practice of one form of this invention, it is desirable to effect a coating of the organosilicon compound on the reinforcing material, such as glass cloth, by immersing it in a solution of the organosilicon compound. For convenience in commercial processing applications, it is desirable that a water solution of the acryloxy or methacryloxy organosilane be employed. Most of the organosilanes described herein are substantially water soluble or may be converted to a water soluble or water dispersible form by hydrolysis of the ($OR^3$) groups. This hydrolysis may be catalyzed by the use of either acids or bases. Organic solvents may also be employed either by themselves or in admixtures with water. Such solvents include the alkanols and the ether alkanols, such as ethanol, propanol, methoxyethanol, ethoxyethanol and the like, and the aromatic hydrocarbons, such as benzene, toluene, xylene and the like.

This reinforcing material is then dried to remove the solvent and cured to form an adherent coating of the organosiloxane on the surface of the reinforcing material.

The so-treated reinforcing material can then be used immediately for combination with a curable polymeric material to form a useful composite or it can be stored for later use in making such composite. The terms "curable," "cured" and "curing" as used in this application are intended to mean the formation of a substantially solid polymer. These terms are applicable both to the organosilane and to the useful polymeric materials as well as to the organosilanepolymeric material combinations.

An alternate form of the invention is to mix the novel organosilane with the curable polymeric material and then apply such mixture to the reinforcing material at the time of formation of the composite. In this form of the invention, a sufficient amount of the novel organosilane or siloxane comes in contact with the surface of the reinforcing material to form a high strength bond between the reinforcing material and the curable polymeric material.

In still another form of the invention, the novel organosilane is incorporated into the curable polymeric material so that the organosilane can aid in the curing of such polymer and improve the resulting properties of the cured polymer. In this fashion, a composite structure is not the ultimate product since a reinforcing material need not be employed.

The novel organosilicon compositions of the present invention can be prepared in various ways. One process of preparation is to react a silane containing an Si—H bond with an ester of an alcohol containing triple bond (acetylenic) unsaturation and acrylic or methacrylic acid in the presence of a platinum catalyst. An example of this preparation is the reaction between HSi(OCH$_3$)$_3$ and CH$_2$=C(CH$_3$)COOCH$_2$C≡CH to form

CH$_2$=C(CH$_3$)COOCH$_2$CH=CHSi(OCH$_3$)$_3$

A further example of this process is the reaction between HSiCl$_3$ and CH$_2$=C(CH$_3$)COOCH$_2$C≡CH to form

CH$_2$=C(CH$_3$)COOCH$_2$CH=CHSi(OCH$_3$)$_3$ followed by esterification with methanol to form

CH$_2$=C(CH$_3$)COOCH$_2$CH=CHSiCl$_3$

An alternate process is the reaction between an alkali metal salt of acrylic or methacrylic acid with a haloalkenylsilane. An example of this preparation is the reaction between CH$_2$=C(CH$_3$)COONa and ClCH$_2$CH=CHSi(OC$_2$H$_5$)$_3$ to form 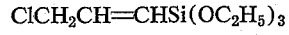 CH$_2$=C(CH$_3$)COOCH$_2$CH=CHSi(OC$_2$H$_5$)$_3$.

The reaction conditions for carrying out these preparation processes are not narrowly critical. Reactions can be carried out in the range from simple mixing at room temperature up to refluxing at elevated temperatures. In order to obtain high yields of desired product, it is preferable to maintain the time-temperature relation during reaction such that polymerization of the unsaturated groups is minimized. This relation will vary depending on the particular reactants employed. It is also preferred to employ a polymerization inhibitor in the reaction mixture. All of these reactions are generally exothermic but require different initiation temperatures depending on the particular reactants employed.

The relative amounts of the starting materials is not narrowly critical. The preparation reactions theoretically require equal molar amounts of the reactants but less or greater amounts of each can be used.

The epoxidized acryloxy or methacryloxy organosilicon compounds of the present invention may be obtained by conventional epoxidation of the ethylenically unsaturated compound of Formula 1, such as, for example, by the process described in U.S. Pat. 3,235,570, patented Feb. 15, 1966, which involves the use of peracetic acid or by the procedure described by Eisch et al., "Journal of Organic Chemistry," (February 1963), p. 487, by reaction of the acryloxy or methacryloxy organosilicon compounds with a solution of peroxytrifluoroacetic acid in methylene chloride with suspended sodium carbonate as a trifluoroacetic acid scavenger. In operating the epoxidation reaction, it is desirable to keep the reaction temperature below about 80° C. to ensure against epoxidation or polymerization of the acrylyl or methacrylyl ethylenic unsaturation.

These epoxidized acryloxy and methacryloxy silicon compounds may be similarly employed as the non-epoxidized silicon compounds. The epoxide group can be attacked by conventional epoxide organic hardeners such as amines, carboxylic acids and alcohols, lending added functionality to the silicon compounds. Thus, the epoxidized acryloxy and methacryloxy hydrolyzable silanes may be useful for coating on inorganic oxide substrates, metal surfaces, and the like to act as a coupling agent for other resinous materials which are subsequently applied to the surface. For example, the compound gammamethacryloxy-alpha, beta-epoxy-propyltrimethoxysilane

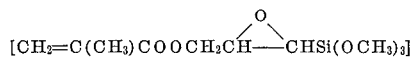
[CH$_2$=C(CH$_3$)COOCH$_2$CH—CHSi(OCH$_3$)$_3$]

formed by the epoxidation, according to the procedure of Eisch et al., supra, of

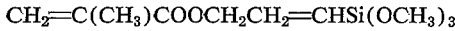
CH$_2$=C(CH$_3$)COOCH$_2$CH$_2$=CHSi(OCH$_3$)$_3$ can be hydrolyzed in water to form an equeous siloxanol solution. The solution is coatable on fiber glass to effect, upon drying, complete conversion of the siloxanol to siloxane.

The coated glass can then be employed in combination with the unsaturated polyester laminating resins. By heating the resin-coated glass in the presence of a peroxide catalyst and, if desired, a diamine, such as diethylenetriamine, one may effect bonding through not only the ethylenic unsaturation of the methacryloxy moiety, but also through opening of the epoxide moiety. By increasing the amount of reaction between the siloxane and the resin, one can expect enhanced bonding of the polyester resin to the glass.

Preparation of the novel acryloxy or methacryloxy organosilicon compounds of the present invention is illustrated in more detail by the following examples.

EXAMPLE I

Into a 2-liter, 3-neck, round-bottomed flask fitted with a distillation column packed with ¼ in. dia. glass helices, decanting still head, nitrogen sparge tube and thermometer were charged 495 grams of propargyl alcohol, 500 grams of methylacrylic acid, 175 grams of isopropylether (solvent) and 20 grams of N,N'-diphenylparaphenylenediamine (polymerization inhibitor). All ingredients were fully mixed and dissolved and then a solution of 22.5 grams of concentrated sulfuric acid in 100 grams of isopropylether was added to the system. The sulfuric acid is a catalyst for the reaction between the methacrylic acid and the propargyl alcohol. The reactants were heated to reflux under a nitrogen atmosphere and water was removed from the still head as formed. During a period of 23¾ hours, a total of 123 grams of water was collected. The reaction products were cooled to 50° C. and transferred to a clean 2-liter flask and an additional 5 grams of N,N'-diphenylparaphenylenediamine (polymerization inhibitor) was added. The contents were fractionally distilled under an absolute pressure of 23 mm. mercury and a total of 510 grams of propargyl methacrylate was collected. Hydroquinone (polymerization inhibitor) was added to this purified product in an amount of 34 parts per million by weight. The propargyl methacrylate product had the properties of B.P. −63° C./23 mm. mercury; refractive index of $n_d^{25}$=1.4466; density of $d_{26°}$=0.975 gms./cc. Infrared spectroscopy analysis confirmed a structure of

CH$_2$=C(CH$_3$)COOCH$_2$C≡CH

EXAMPLE II

To a 500 cc. round-bottomed flask fitted with an agitator, thermometer, dropping funnel, reflux condenser and nitrogen sparge tube were added 186 grams of propargyl methacrylate prepared by the method of Example I above, 8 grams N,N'-diphenylparaphenylenediamine (polymerization inhibitor) and 20 parts per million by weight platinum based on total weight of all charged materials. The platinum was added as a chloroplatinic acid hexahydrate solution in a mixture of ethanol and the dimethyl ether of ethylene glycol. This solution contained 1.6 weight percent platinum. The kettle temperature was raised to 95° C. while adding 185 grams of $HSi(OCH_3)_3$ (trimethoxyhydrogensilane) during a ¾ hour period. When the reactants were all mixed the contents were heated one hour at 100 °C. Hydroquinone polymerization inhibitor (0.5 gram) was added to the reaction product mixture and such mixture was fractionally distilled at reduced pressure in a Vigreaux column. A total of 236.5 grams of product was isolated. This product was inhibited with the addition of 130 parts per million by weight hydroquinone. The product had the following properties: B.P. —90° C./1.6 mm. mercury; refractive index $n_d^{25} = 1.4382$; and density $d_{25} = 1.05$ grams/cc. Infrared spectroscopy analysis confirmed a structure for the product of $CH_2=C(CH_3)COOCH_2CH=CHSi(OCH_3)_3$ Chemical analysis of the product had the following results: Theoretical for $C_{10}H_{18}SiO_5$; 48.7% C, 7.3% H, 11.4% Si, 37.8% methoxy, Bromine No. 130; Found: 48.5% C, 7.6% H, 11.6% Si, 39.7% methoxy; Bromine No. 124.

A similar reaction can be carried out between propargyl acrylate and trimethoxyhydrogensilane to form acryloxypropenyltrimethoxysilane.

Use of the above prepared novel compound as a coupling agent in a process for producing novel composite articles is illustrated by the following examples.

EXAMPLE III

This example shows a comparison of the effect on the flexural strength of a glass reinforced unsaturated polyester resin laminate having (1) prior art $CH_2=CHSi(OCH_2CH_2OCH_3)_3$ coupling agent, and (2) new $CH_2=C(CH_3)COOCH_2CH=CHSi(OCH_3)_3$ coupling agent.

The glass cloth used in the preparation of the laminates was style 181–112. This is a satin weave cloth having a thickness of 10 mils, weighing about 8.9 ounces per square yard, having 57 x 54 ends and picks per square inch and having a breaking strength of 375 x 350 pounds per inch width. The weaving size had also been burned off and the cloth cleaned. The cloth was also water washed and dried. All of the above values are average typical characteristics and may vary somewhat in a specific specimen of cloth.

In this example a high temperature curing unsaturated polyester resin was used. This resin was a reaction product between maleic anhydride and ethylene glycol and also contains some monomeric styrene. It is sold under the trade name Paraplex P–43 by the Rohm and Haas Company. The resin was prepared for the laminate by mixing 270 grams Paraplex P–43 with 30 grams of monomeric styrene to lower the viscosity of the resin. A curing catalyst was added in the amount of 2 weight percent Luperco ATC, a peroxide manufactured by the Lucidol Company containing 50 weight percent benzoyl peroxide.

The glass cloth was coated with coupling agent in the following manner. Seven inch-wide strips of cloth were cut. These strips of cloth were passed through an aqueous solution containing one weight percent of the coupling agent and 0.04 weight percent morpholine. The morpholine was used to obtain the desired pH for proper hydrolysis of the coupling agent. The hydrolysis of the coupling agent in the aqueous solution is catalyzed by either a slightly acid (pH about 3.5–5) or slightly basic (pH about 7.5–9) solution. It is important that the solution not be so acid or alkaline as to cause condensation of the coupling agent in solution rather than on the surface of the reinforcing material. The cloth picked up about one-half of its own weight of solution and after evaporation of the solvent there remained a coating of the coupling agent on the cloth of about 0.5 weight percent of the weight of the cloth. The treated strips of cloth were air dried for two hours and then heated at 125° C. for two minutes to cure the organosilane compound. The cloth was then cut into 7-in. x 7-in. pieces for the laminated preparation.

The laminate is prepared in the following manner: A sheet of flexible film, such as cellulose acetate, approximately six times the size of the laminate to be prepared is placed on a table and one ply of coupling agent-coated 181 glass cloth 7-in. x 7-in. is placed on it. A portion of the catalyzed resin is evenly poured on the cloth. Another ply of glass cloth is placed on the resin and additional resin poured on the cloth. This procedure is continued until 14 plies of cloth have been added and all are wetted by resin. The excess flexible film is then wrapped over the wet laminated composite in such a manner as to enclose it in a bag and sealed. Air is removed from the laminate by gently rolling it with a bar of wood or metal. The press that is to be used to cure the laminate is pre-heated to 145° F. (63° C.) and fitted with stops approximately ⅛-in. thick. The wet laminated composite is placed in the press and cured for one hour at 145° F. (63° C.) and 15 p.s.i. pressure and one hour at 250° F. (121° C.) and 15 p.s.i. pressure. The press is cooled prior to removing the laminate. This procedure results in a laminate product approximately ⅛-in. thick.

Upon removal from the press, the flexible film covering is removed and test speciments 4-in. x ½-in. are cut using a diamond saw in a standard table mounting. The laminates were evaluated by carrying out tests of flexural strength on such samples. Three to five tests were made on the material as cured and three to five tests on specimens that were subjected to boiling tap water for a period of eight hours, cooled to room temperature in water and then tested wet. The flexural tests were carried out substantially as described in Air Force Specification MILP–8013 (also Federal Specification LP–406a Method No. 1031). A specimen was placed on standardized supports, 2 inches apart, and the specimen then broken by a load applied midway between these two supports. The resulting values for several specimens were then averaged to get representative flexural strengths for dry and wet laminates. The following table shows the results of these tests.

TABLE I

Flexural strengths of 14 plies of 181 cloth coated with various coupling agents in a high temperature cured unsaturated polyester laminate

| Coupling agent | Weight percent of coupling agent on cloth | Flexural strength, p.s.i. | | Percent retention |
|---|---|---|---|---|
| | | Dry | 8 hour boil | |
| $CH_2=CHSi(OCH_2CH_2OCH_3)_3$ | 0.5 | 84,000 | 66,000 | 78.6 |
| $CH_2=C(CH_3)COOCH_2CH=CHSi(OCH_3)_3$ | 0.5 | 97,600 | 87,000 | 89.2 |

It is apparent from the above data that the methacryloxy-propenyltrimethoxysilane coupling agent provides substantially improved flexural strengths both for dry and wet conditions as compared with prior art use of vinylsilanes. The wet strength data is particularly significant since the tests were run under the severe conditions of 8 hours in boiling water.

The above example showing utility of the novel silanes of the present invention should not be interpreted as limiting in the description of useful coupling agents for composite articles. All of the silanes included within the generic formula of this invention also have utility as coupling agents in such composites.

While it is preferred that the reinforcing material be coated with about 0.5 weight percent of the organosilane based on weight of reinforcing material to form a satisfactory improved composite article with the curable polymeric materials, amounts from 0.02 to 5.0 weight percent organosilane based on weight of reinforcing material can also be used. For large surface area reinforcing material, such as finely divided fillers, even up to 20 weight percent organosilane based on weight of reinforcing material can be used.

The novel curable mixtures and cured composite article of this invention are not limited to employing the glass cloth reinforcing material of the above example. Other reinforcing materials and extending materials, such as pigments and/or fillers, such as silica, titania, carbon black, silicates, clays, oxides, carbonates and the like and/or fibers, such as cellulosic fibers, mineral wool fibers and the like, preferably in the form of a matted or woven fabric, can also be employed.

The following example illustrates the use of an integral blend of novel organosilanes and curable polyester resin to form composite articles with a silica reinforcing material.

EXAMPLE IV

The heat curable unsaturated polyester resin used in this example was the above described Paraplex P-43. The resin was prepared for use in the formation of a composite article by mixing 6 parts by weight of Paraplex P-43 with 1 part by weight monomeric styrene to lower the viscosity of the resin. A curing catalyst was added in the amount of 1 weight percent Luperco ATC, a peroxide manufactured by the Ludicol Company containing 50 weight percent benzoyl peroxide. A mixture of 50 weight percent of the above catalyzed resin and 50 weight percent of finely divided silica was then prepared. This composition was labeled "control." A similar mixture containing in addition 0.32 weight percent (based on weight of silica) of methacryloxy-propenyltrimethoxysilane was also prepared. This composition was labeled "Improved." The two mixtures were then separately placed in a press mold and cured for one hour at 145° F. (63° C.) and 15 p.s.i. pressure and one hour at 250° F. (121° C.) and 15 p.s.i. pressure. The press mold was then cooled and the molded cured product removed. Upon removal from the press mold, test specimens 4-in. x ½-in. x ⅛-in. were cut from the cured product. A portion of the specimens from each cured product was reserved as dry specimens and another portion was immersed for eight hours in boiling tap water prior to testing.

The results of these tests are shown in the following table.

TABLE II.—FLEXURAL STRENGTHS OF CURED POLYESTER-SILICA COMPOSITE ARTICLES

| Mixture | Flexural strength, p.s.i. | | Percent retention |
|---|---|---|---|
| | Dry | 8-hour boil | |
| Control | 11,500 | 6,500 | 56.5 |
| Improved | 16,000 | 13,000 | 81.3 |

It is apparent from the above data that the incorporation of a novel organosilane of the present invention, such as methacryloxypropenyltrimethoxysilane, in a curable polymer system containing reinforcing material, such as finely divided silica, provides substantially improved flexural strengths both for dry and wet conditions. The wet strength data is particularly significant since the tests were run under the severe conditions of 8 hours in boiling water.

Integral blends of methacryloxypropenyltrimethoxysilane, for example, and curable polymers, such as unsaturated polyester resins, can also be usefully employed to make glass cloth laminates and other composite articles.

The silane of Example 2 can be reacted with a solution of peroxytrifluoroacetic acid in methylene chloride with suspended sodium carbonate in accordance with the procedure set forth by Eisch et al., supra, at page 491, under the heading "Expoxethyltriethylsilane (Short Reaction Time)" to produce the compound having the formula:

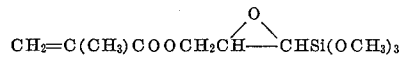

The temperature of the epoxidation reaction is maintained below 80° C.

It should be noted that the new organosilane compositions of the present invention are useful not only as improved additives to curable polymer materials, but they can also be used to form resins and water-repellent coatings by procedures known in the organosilicon art.

The incorporation of the organosilane additive in polysiloxane systems can have an improvement mechanism that may be different from that occurring when the organosilane additive is incorporated in purely organic systems, such as unsaturated polyester resins. In the latter case, the organosilane acts principally as a coupling agent between the unsaturated polyester resin and a reinforcing agent, such as glass cloth. The combination of the organosilane and polysiloxane systems, on the other hand, provides different improvements. First, the organosilane improves the mold cure bond of polysiloxane to steel surfaces without a binder layer. Second, the organosilane results in lower compression set. Third, the organosilane improves mold cure properties. In this latter respect it acts as a curing accelerator in that a more complete cure with higher strength is obtained under mold cure conditions rather than requiring lengthy postcure to develop these properties.

While the above discussion has been primarily directed to acryloxy and methacrylyloxy organosilanes, it should be understood that novel organosiloxane polymers obtained from these silanes are also included by Formula I to be within the scope of the present invention. Such organosiloxane polymers can be conveniently obtained by hydrolysis and condensation of the above-described silanes of Formula 1 as depicted when $m$ is one. The resulting organosiloxane polymers may be characterized as having the unit formula:

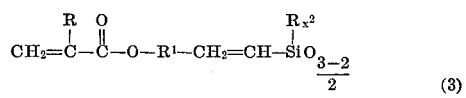

(3)

wherein R, $R^1$, $R^2$ and $x$ are as described above for Formula 1. These organosiloxane polymers are also useful in curable polymeric systems according to the present invention.

Copolymeric organosiloxanes containing at least one unit of an organosiloxane having the unit Formula 3 and at least one unit of an organosiloxane having the unit formula:

1.

(4)

wherein $R^5$ and $R^6$ are hydrocarbon radicals and $y$ is an integer from 0 to 2 inclusive are also included within and are useful in the present invention. The same homopolymers and copolymers of the polymer unit depicted in Formula 2 may be made by conventional procedures of hydrolysis and condensation.

What is claimed is:
1.
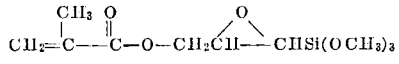

References Cited
UNITED STATES PATENTS

| | | | |
|---|---|---|---|
| 2,823,218 | 2/1958 | Speir et al. | 260—448.2 |
| 3,258,477 | 6/1966 | Plueddemann et al. | 260—448.8 |

MORRIS LIEBMAN, Primary Examiner

S. M. PERSON, Assistant Examiner

U.S. Cl. X.R.

260—37, 38, 39, 40, 41, 41.5, 46.5

UNITED STATES PATENT OFFICE
CERTIFICATE OF CORRECTION

Patent No. 3,555,051    Dated January 12, 1971

Inventor(s) James G. Marsden et al

It is certified that error appears in the above-identified patent and that said Letters Patent are hereby corrected as shown below:

Column 2, lines 61 to 66, the formulas should read in sequence as follows:

$$CH_2=CHCOOCH_2CH=CHSi(OCH_3)_3;$$
$$CH_2=C(CH_3)COOCH_2CH=CHSi(OCH_3)_3;$$
$$CH_2=C(CH_3)COOCH_2CH_2CH=CHSi(OC_2H_5)_3;$$
$$CH_2=C(CH_3)COOCH_2CH_2=CH_2CH_2CH_2=CH_2Si(OCH_3)_x;$$
$$CH_2=CHCOOCH_2CH=CHSi(OOCCH_3)_3.$$

Column 3, line 5, in the formula:

$-R_5-$ should read $-R^5-$.

Column 6, line 27, "equeous" should read --aqueous--. Column 9, line 24, "article" should read --articles--; line 59, "speciments" should read --specimens--. Column 10, line 18, "Epoxethyltriethylsilane" should read --Epoxyethyltriethylsilane--; line 49, after "organosilanes" delete the period and insert a comma; line 60, in the formula:

$-SiO_{\frac{3-2}{2}}$ should read $-SiO_{\frac{3-x}{2}}$ ;

line 70, delete "1"; lines 71-75, in the formula:

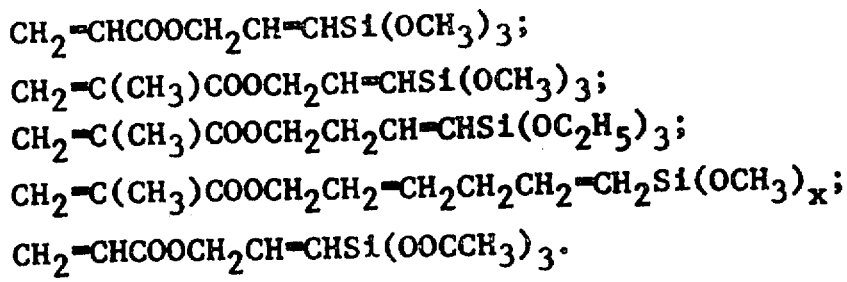

Signed and sealed this 17th day of September 197

(SEAL)
Attest:

McCOY M. GIBSON JR.
Attesting Officer

C. MARSHALL DANN
Commissioner of Pat